United States Patent
Kimura

(10) Patent No.: US 9,025,052 B2
(45) Date of Patent: May 5, 2015

(54) IMAGE PICKUP APPARATUS THAT PROVIDES FOR CONTROL OF ANGLE OF VIEW DURING AUTO ZOOMING

(75) Inventor: Takayuki Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/915,337

(22) Filed: Oct. 29, 2010

(65) Prior Publication Data

US 2011/0109786 A1  May 12, 2011

(30) Foreign Application Priority Data

Nov. 6, 2009 (JP) ................................ 2009-254982

(51) Int. Cl.
*H04N 5/262* (2006.01)
*H04N 5/232* (2006.01)

(52) U.S. Cl.
CPC ............. *H04N 5/2628* (2013.01); *H04N 5/232* (2013.01)

(58) Field of Classification Search
CPC .......................... H04N 5/23296; H04N 5/2628
USPC ........................................................ 348/335
See application file for complete search history.

(56) References Cited

U.S. PATENT DOCUMENTS

| 5,604,562 | A  | * | 2/1997 | Aoyama | 396/79 |
| 5,761,560 | A  | * | 6/1998 | Miyazawa et al. | 396/532 |
| 2002/0085099 | A1 | * | 7/2002 | Hirasawa et al. | 348/222 |
| 2003/0156199 | A1 | * | 8/2003 | Shindo et al. | 348/207.99 |
| 2003/0223739 | A1 |   | 12/2003 | Natsume et al. | |
| 2008/0205869 | A1 | * | 8/2008 | Nose | 396/77 |
| 2008/0246852 | A1 | * | 10/2008 | Mori | 348/222.1 |
| 2010/0074606 | A1 | * | 3/2010 | Sasaki | 396/121 |

FOREIGN PATENT DOCUMENTS

| CN | 1469151 A | | 1/2004 |
| JP | 02201328 A | * | 8/1990 |
| JP | 09-015481 A | | 1/1997 |
| JP | 09-018767 A | | 1/1997 |
| JP | 09-149311 | | 6/1997 |
| JP | 09-149311 A | | 6/1997 |

OTHER PUBLICATIONS

Aug. 3, 2012 Chinese Office Action, that issued in Chinese Patent Application No. 201010536655.2.
Apr. 7, 2013 Chinese Office Action, that issued in Chinese Patent Application No. 201010536655.2.
Sep. 26, 2013 Japanese Office Action, that issued in Japanese Patent Application No. 2009-254982.

* cited by examiner

*Primary Examiner* — Usman Khan
(74) *Attorney, Agent, or Firm* — Cowan, Liebowitz & Latman, P.C.

(57) ABSTRACT

A manual input via a manual input unit while automatically changing a zoom magnification via a zoom control unit is permitted, and after the manual input, the zoom magnification is automatically changed so that a size of an object output from an object extraction unit becomes a second size in relation to an angle of view.

14 Claims, 8 Drawing Sheets

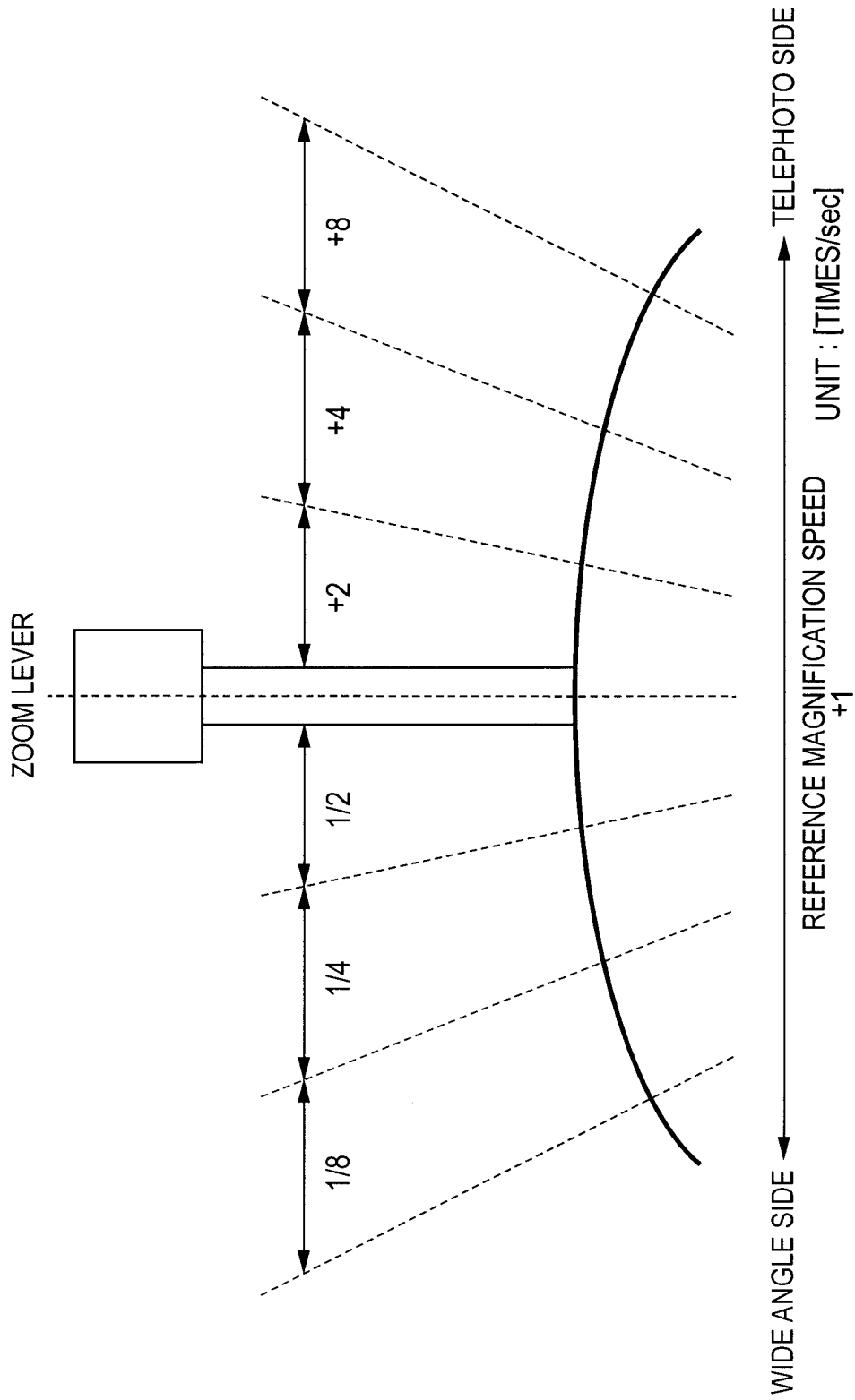

IMAGE PICKUP APPARATUS THAT PROVIDES FOR CONTROL OF ANGLE OF VIEW DURING AUTO ZOOMING

BACKGROUND OF THE INVENTION

1. Field of the Invention

The present invention relates to an image pickup apparatus including an auto zoom function that controls a zoom lens so that a captured object image constantly has a fixed size.

2. Description of the Related Art

In conventional image pickup apparatuses, an auto zoom function that controls a zoom lens so that a captured object image constantly has a fixed size has been proposed in addition to automatic control of, e.g., an iris, exposure, focus and white balance. Use of the auto zoom function eliminates the need for the troublesome work of consistently adjusting the angle of view by manually performing zooming when one wishes to keep a moving object at a fixed angle of view. However, use of such auto zoom has caused a problem in that once the size of an object relative to a frame (hereinafter referred to as "target angle of view") maintained by an auto zoom is determined, the target angle of view cannot be changed unless the auto zoom is cancelled.

For example, it is supposed that when a child, which is an object, runs in a footrace in an athletic meet, a user wishes to capture an image of the child at a bust shot angle of view from the start position to the position immediately before the goal and at a full-length portrait angle of view at the goal position at the moment that the child breaks the tape, using an auto zoom. In this case, it is necessary to, first, set the target angle of view so as to be a bust shot angle of view for the start position, and re-set the target angle of view so as to be a full-length portrait angle of view immediately before the goal. However, conventional auto zoom functions do not allow change of a target angle of view during an auto zoom being underway, thus requiring the work of temporarily cancelling the auto zoom immediately before the goal position, re-setting the target angle of view and then restarting the auto zoom.

In response to the aforementioned problem, the image pickup apparatus described in Japanese Patent Application Laid-Open No. H09-149311 includes a manual adjustment zoom button intended to change a target angle of view. Upon the manual adjustment zoom button being operated during an auto zoom being underway, a detection unit detects an input to the manual adjustment zoom button, and automatically temporarily cancels the control of a zoom lens according to the auto zoom, and accepts a manual operation. Consequently, a user can set an object at a desired angle of view using the manual adjustment zoom button. Upon the end of the operation via the manual adjustment zoom button, the size of the object relative to the frame at the point of time when the operation ended is set as a new target angle of view, and an auto zoom is started again. Use of this technique enables easy change of a target angle of view even during an auto zoom being underway.

However, in the conventional art, the zoom speed during the manual operation is not taken into consideration. When a user switches the mode from auto zoom to manual operation, the zoom speed may sharply change unless the user skillfully adjusts the zoom speed of the manual operation to the zoom speed of the auto zoom immediately before the switching to the manual operation, resulting in a problem in that an image giving a feeling of strangeness in appearance may be formed.

For example, when an object is quickly coming toward a user, high-speed zooming is performed to change the angle of view to the wide angle side because of control according to an auto zoom in order to keep the size of the object constant. Here, when the user wishes to change the target angle of view to the wide angle side via a manual operation, it is necessary to perform zooming to the wide angle side at a speed higher than the zoom speed during the auto zoom. However, it is very difficult to estimate the zoom speed of the auto zoom performed immediately before the switching to the manual operation and know the amount of manual input necessary to make a change to achieve a desired target angle of view. Thus, a difference occurs between the zoom speed of the auto zoom performed immediately before the mode switching and the zoom speed of the manual operation, disabling maintenance of the zoom speed continuity, which may cause an image giving a feeling of strangeness in appearance to be formed.

Furthermore, when zooming is performed at a high speed via a manual operation using a zoom lever for changing a zoom speed step by step in accordance with the strength of pressing the zoom lever, which is a manual input unit, the zoom lever can be pressed with a desired strength after passing through the region in which the zoom lever is temporarily pressed with only weak pressing strength, and thus, low-speed zooming is instantaneously performed. In other words, if high-speed zooming is performed by pressing the zoom lever strongly via a manual operation when an object moves largely, also, low-speed zooming is instantaneously performed, thus disabling maintenance of the zoom speed continuity, which may cause a problem similar to the above.

SUMMARY OF THE INVENTION

It is an aspect of the present invention to provide an image pickup apparatus enabling a target angle of view to be changed smoothly via a manual operation during an auto zoom being underway to provide a captured image that does not give a feeling of strangeness in appearance caused by zoom speed discontinuity when the manual operation is started.

According to the present invention, an image pickup apparatus includes an image pickup unit configured to convert an optical image into an image signal; an object extraction unit configured to detect an object from the image signal and output a size of the detected object; a zoom control unit configured to perform control to automatically change a zoom magnification so that the size of the object output from the object extraction unit becomes a first size; and a manual input unit configured to enable manual change of the zoom magnification, wherein a change of the zoom magnification via the manual input unit during automatically changing the zoom magnification via the zoom control unit is permitted, and after the change via the manual input unit, the zoom magnification is automatically changed so that the size of the object output from the object extraction unit becomes a second size in relation to an angle of view.

According to the present invention, when a target angle of view is changed via a manual input without cancelling the auto zoom during an auto zoom, the size of an object, which is a target of the auto zoom, that is, a reference value can be immediately changed via a manual input unit. In addition, such manual change can easily be made during the auto zoom being underway, and the change of the angle of view can smoothly be made, providing a captured image that does not give a feeling of strangeness in appearance caused by zoom speed discontinuity between before and after the start of the change of the target angle of view via the manual input.

Further features of the present invention will become apparent from the following description of exemplary embodiments with reference to the attached drawings.

BRIEF DESCRIPTION OF THE DRAWINGS

FIG. 8 is a diagram illustrating reference value magnification speed s allocated to a zoom lever according to a second embodiment of the present invention.

DESCRIPTION OF THE EMBODIMENTS

Preferred embodiments of the present invention will now be described in detail in accordance with the accompanying drawings.

First Embodiment

Hereinafter, an image pickup apparatus according to a first embodiment of the present invention will be described.

Figure 1:
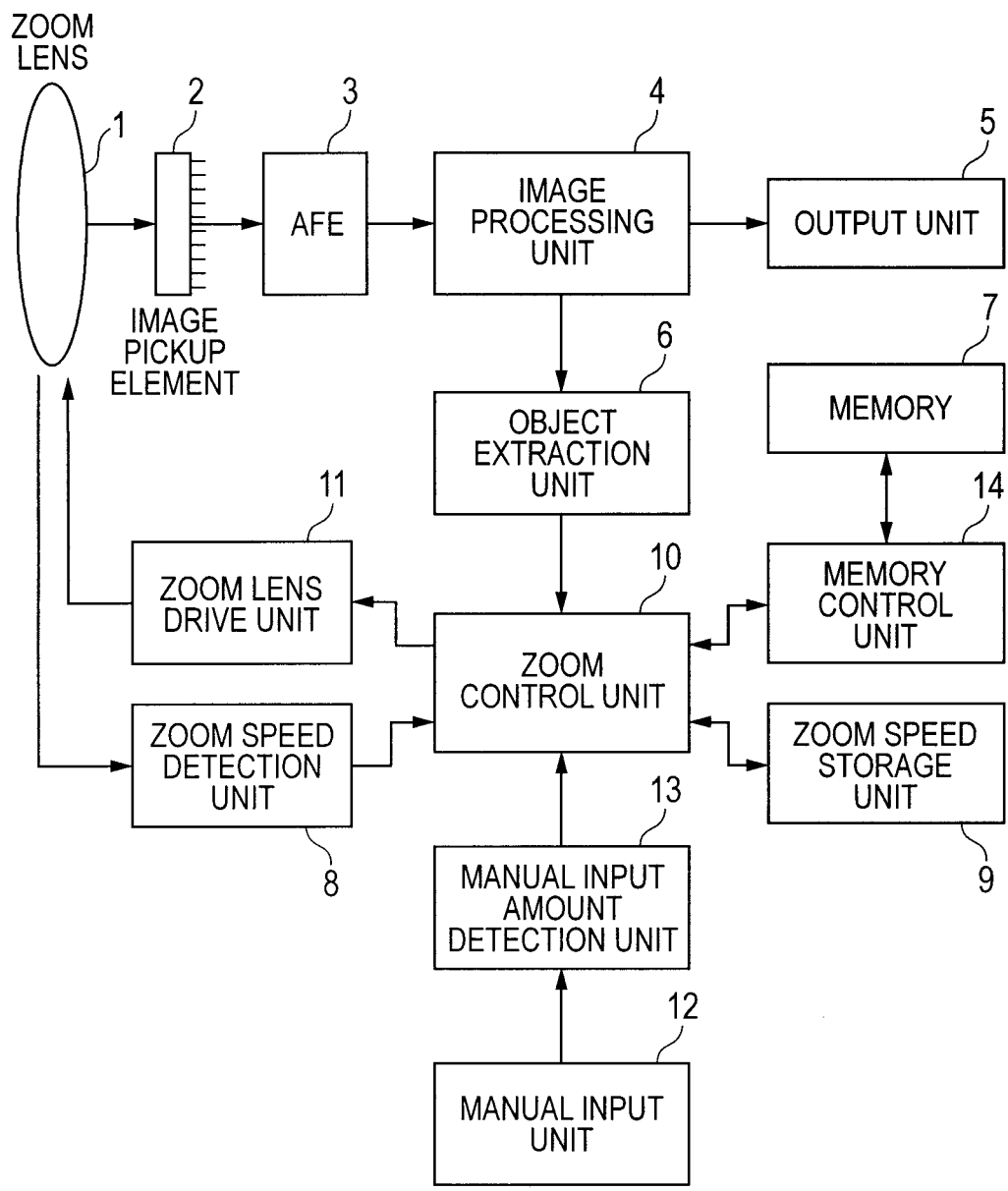
FIG. 1 is a block diagram illustrating a main configuration of an image pickup apparatus according to a first embodiment of the present invention.

FIG. 1 is a block diagram illustrating a main configuration of an image pickup apparatus according to the present embodiment.

The illustration in FIG. 1 includes a zoom lens 1, an image pickup element 2 using, e.g., a CCD sensor or a COMS sensor, an AFE (analog front end) 3, an image processing unit 4, an output unit 5, an object extraction unit 6 and a memory 7. The illustration also includes a zoom speed detection unit 8, a zoom speed storage unit 9, a zoom control unit 10, a zoom lens drive unit 11, a manual input unit 12, a manual input amount detection unit 13 and a memory control unit 14.

First, the basic circuit configuration of the image pickup apparatus will be described. Light passing through the zoom lens 1 forms an image on a light-receiving surface of the image pickup element 2, and the formed optical image is photoelectrically converted by the image pickup element 2 and output as electric analog signals. The analog signal output from the image pickup element 2 are input to the AFE 3. For the analog signal output from the image pickup element 2, difference in signal level between the analog signal and the reference level is detected in a CDS circuit in the AFE 3 and output as an analog voltage value. The analog signal output from the CDS circuit is subjected to gain processing by an AGC circuit in the AFE 3, and the signal level output as a result of the processing are converted into digital data by an A/D conversion circuit in the AFE 3. The digital image signal output from the A/D conversion circuit is input to the image processing unit 4 as an ultimate AFE 3 output. The image processing unit 4 performs digital image processing, such as gamma correction and/or outline emphasis, on the input digital image signal to form a video signal. The video signal formed by the image processing unit 4 are converted into an analog signal by a D/A conversion circuit (not illustrated) and output by the output unit 5.

The object extraction unit 6 extracts an object from the digital image signal output from the image processing unit 4, and detects the size of the extracted object. The memory 7 stores the size of the object relative to a frame, which is maintained by an auto zoom, that is, a target angle of view, as a reference value. Although in the present embodiment, the size of the object at the point of time when an auto zoom was started is used as a reference value, an optimum object size may be stored in advance in the memory 7.

The zoom control unit 10 compares the size of the object calculated by the object extraction unit 6 and the reference value stored in the memory 7, and calculates a zoom magnification for making the size of the object equal to the reference value. Next, referring to a data table stored in advance in the zoom speed storage unit 9, an optimum zoom speed is determined based on the zoom magnification, and the zoom lens 1 is controlled via the zoom lens drive unit 11 so as to achieve the determined zoom speed. A detailed zoom control method will be described later.

Figure 2:
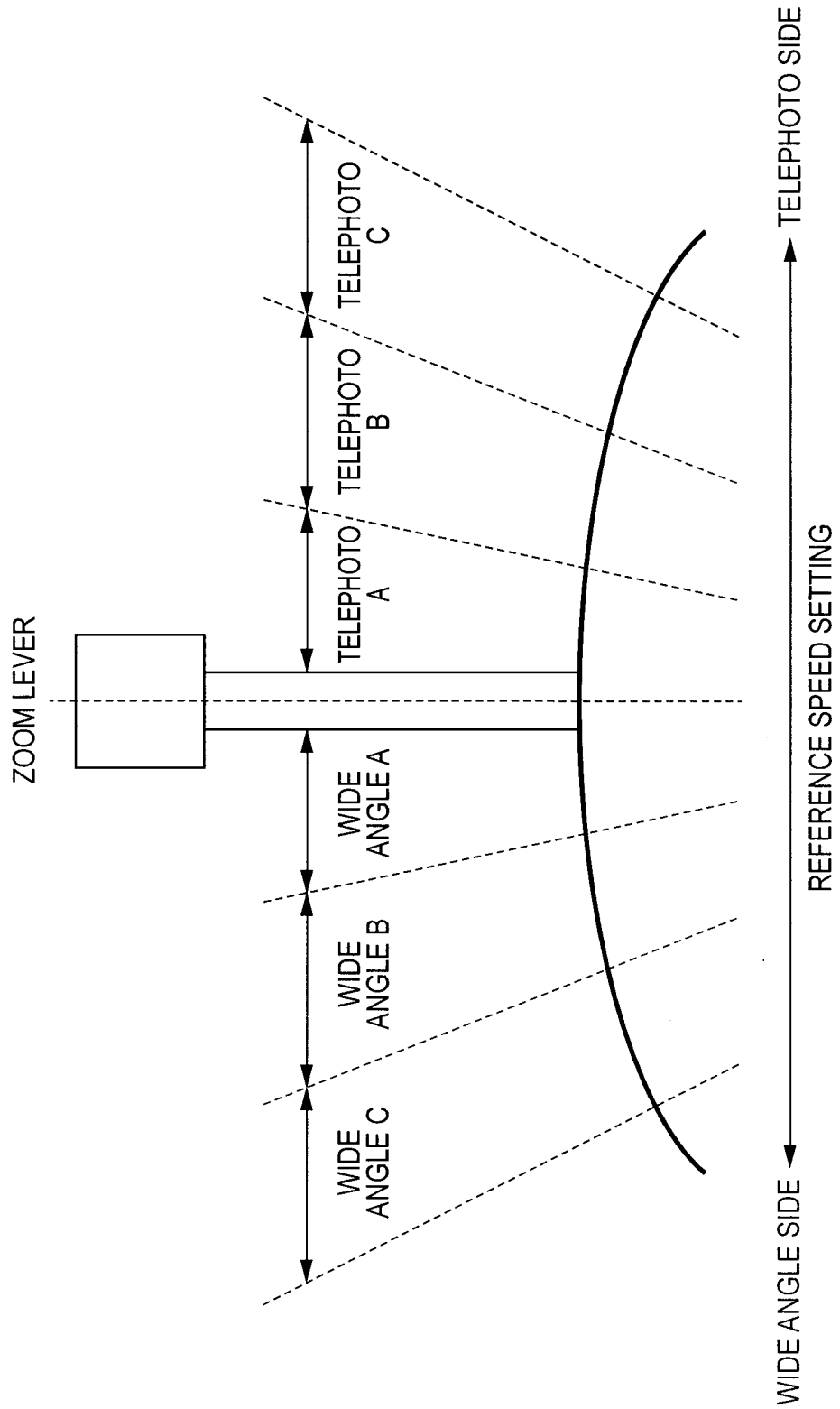
FIG. 2 is a diagram illustrating zoom lever operation according to a first embodiment of the present invention.

The manual input unit 12 is used for manually changing a target angle of view. In the present embodiment, a zoom lever is used to change a zoom speed. The zoom lever can change a zoom speed step by step by means of pressing the zoom lever in the horizontal direction in FIG. 2 according to the strength of pressure applied to the zoom lever. However, the zoom lever in the present invention is not limited to this one, and a zoom speed change unit with another configuration may be used. As illustrated in FIG. 2, a total of six zoom speed grades, i.e., three grades (wide angle A, wide angle B and wide angle C) for the wide angle side and three grades (telephoto A, telephoto B and telephoto C) for the telephoto side, can be allocated to the zoom lever according to the strength of pressure applied to the zoom lever. Regions A (wide angle A and telephoto A) where the strength of pressure applied to the zoom lever is small, the zoom speed is low, and the zoom speed becomes higher as the zoom lever advances further to regions B (wide angle B and telephoto C) and regions C (wide angle C and telephoto C). In the present embodiment, there are 21 zoom speed levels, e.g., −10, −9, −8, −7, −6, −5, −4, −3, −2, −1, ±0, +1, +2, +3, +4, +5, +6, +7, +8, +9, +10, that can be allocated to the grades of the zoom lever. Plus (+) levels are allocated to the telephoto side while minus (−) levels are allocated to the wide angle side. As the absolute value of the numerical value is larger, the zoom speeds to the respective directions are higher. For example, during a normal zoom (in which no auto zoom is performed), a zoom speed of the −3 level is allocated to wide angle A, a zoom speed of the −6 level to wide angle B, a zoom speed of the −9 level to wide angle C, a zoom speed of the +3 level to telephoto A, a zoom speed of the +6 level to telephoto B, and a zoom speed of the +9 level to telephoto C. When the zoom lever is at a reference position, the zoom speed is set to the ±0 level in which no zoom control is performed.

The manual input amount detection unit 13 detects the strength of pressure input via the manual input unit 12, that is, detects in which region from among regions A to C on the wide angle side or regions A to C on the telephoto side the zoom lever is present as a result of being pushed away by means of the pressure. When the manual input amount detection unit 13 determines that there is a manual input, the amount of the manual input, and the latest zoom speed detected by the zoom speed detection unit 8 during the auto zoom (i.e., detected lastly during the auto zoom) are obtained.

Then, a zoom speed is determined based on such pieces of information and the data table stored in advance in the zoom speed storage unit 9, and the target angle of view is changed. Details of a zoom control method for a manual input will be described later.

Figure 3:
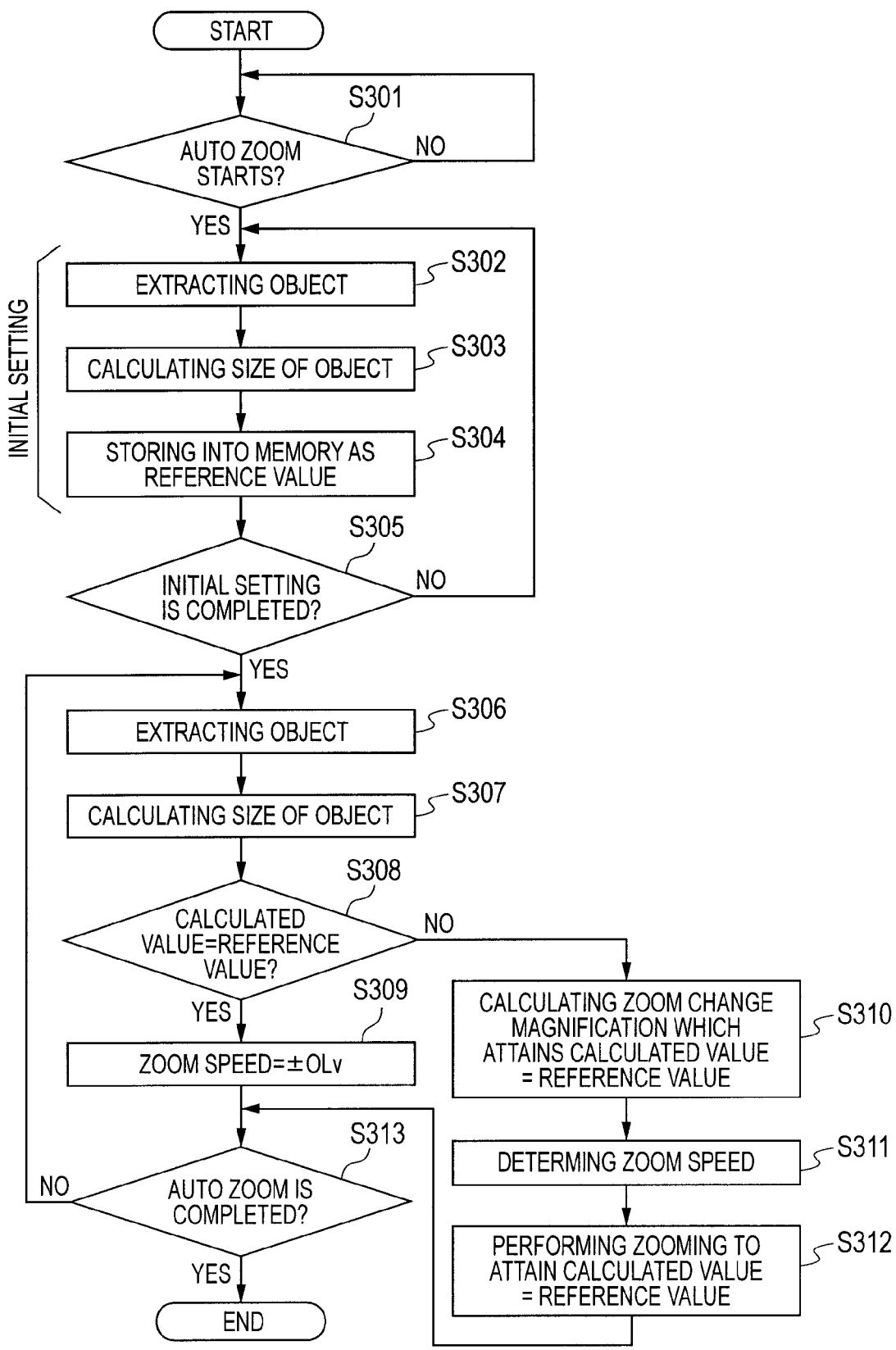
FIG. 3 is a flowchart of zoom control during an auto zoom according to a first embodiment of the present invention.

Hereinafter, a zoom control method (application program) executed by the zoom control unit 10 during an auto zoom in the present embodiment will be described with reference to the flowchart in FIG. 3.

First, whether or not an auto zoom has been started is determined in step S301. For an auto zoom stating method, an auto zoom start button may be provided, or a user may select an object on, e.g., a touch panel. If it is determined in step S301 that an auto zoom has not been started, the process returns to step S301, and whether or not an auto zoom has been started is determined again, which is repeated until it is determined that an auto zoom has been started. If it is determined in step S301 that an auto zoom has been started, the process advances to step S302, and an initial setting from steps S302 to S304 are started.

In step S302, an object of the auto zoom is extracted by the object extraction unit 6.

In step S303, the size of the object extracted in step S302 is calculated.

In step S304, the size of the object calculated in step S303 is stored in the memory 7 via the memory control unit 14 as the size of a target of the auto zoom, that is, a reference value. The process up to this step falls under the initial setting performed at the start of an auto zoom.

In step S305, whether or not the initial setting for the auto zoom has been completed is determined. If a desired reference value is set without instantaneous disappearance of the object, it is determined that the initial setting has been completed, and control according to the auto zoom starts from step S306. If the initial setting has not been made, the process returns to step S302, and the initial setting is made again.

In step S306, the object, which is the target of the auto zoom, is extracted by the object extraction unit 6.

In step S307, the size of the object extracted in step S306 is calculated.

In step S308, whether or not the size of the object calculated in step S307 is the same as the reference value stored in the memory 7 in the initial setting is determined. If it is determined that the size of the object is the same as the reference value, the process advances to step S309, no zoom control is performed (i.e., the zoom speed is set to the ±0 level), and the process advances to step S313. If the size of the object is different from the reference value, the process advances to step S310, and a zoom magnification is calculated. In the present embodiment, the zoom magnification is calculated based on the equation: zoom magnification=reference value/object size. For example, a case where the size of the object, that is, the reference value, stored in the memory 7 in step S304 is a size of 60% relative to the frame while the size of the object calculated in the auto zoom in step S307 is a size of 50% relative to the frame is considered. In this case, the zoom magnification is 1.2 times, and in order to adjust the size of the object to the reference value, 1.2-fold magnification zooming on the telephoto side is performed.

In step S311, based on the zoom magnification calculated in step S310, the zoom speed is determined and stored in the memory 7. For example, if the zoom magnification calculated in step S310 is 1.2 times and zooming must be performed at a zoom speed of no less than the +6 level in order to reflect the zoom magnification in the following field, the zoom speed is determined to be the +6 level.

In step S312, the zoom lens 1 is driven to perform zooming at the zoom speed determined in step S311 so that the size of the object becomes the same as the reference value. After the zooming, the process advances to step S313. As described above, in the image pickup apparatus according to the present embodiment, unless an auto zoom is cancelled, the object extraction unit detects the size of an object even when the zoom magnification has been changed via a manual input unit. Consequently, a zoom control unit is configured so as to control change of the zoom magnification according to change of the size of the object if the size of the object detected when the zoom magnification is changed via the manual input unit, is different from a reference value stored in a memory.

In step S313, whether or not the auto zoom has been cancelled is determined, if it is determined that the auto zoom has been cancelled, the auto zoom is terminated. If it is determined that the auto zoom has not been cancelled, the process returns to step S306. Furthermore, if a new frame is obtained, the flow from step S306 is performed again, which is repeated to perform auto zoom control. For a method for determining the auto zoom cancellation, the determination may be based on the status of the auto zoom start button or an input to the touch panel.

Figure 4:
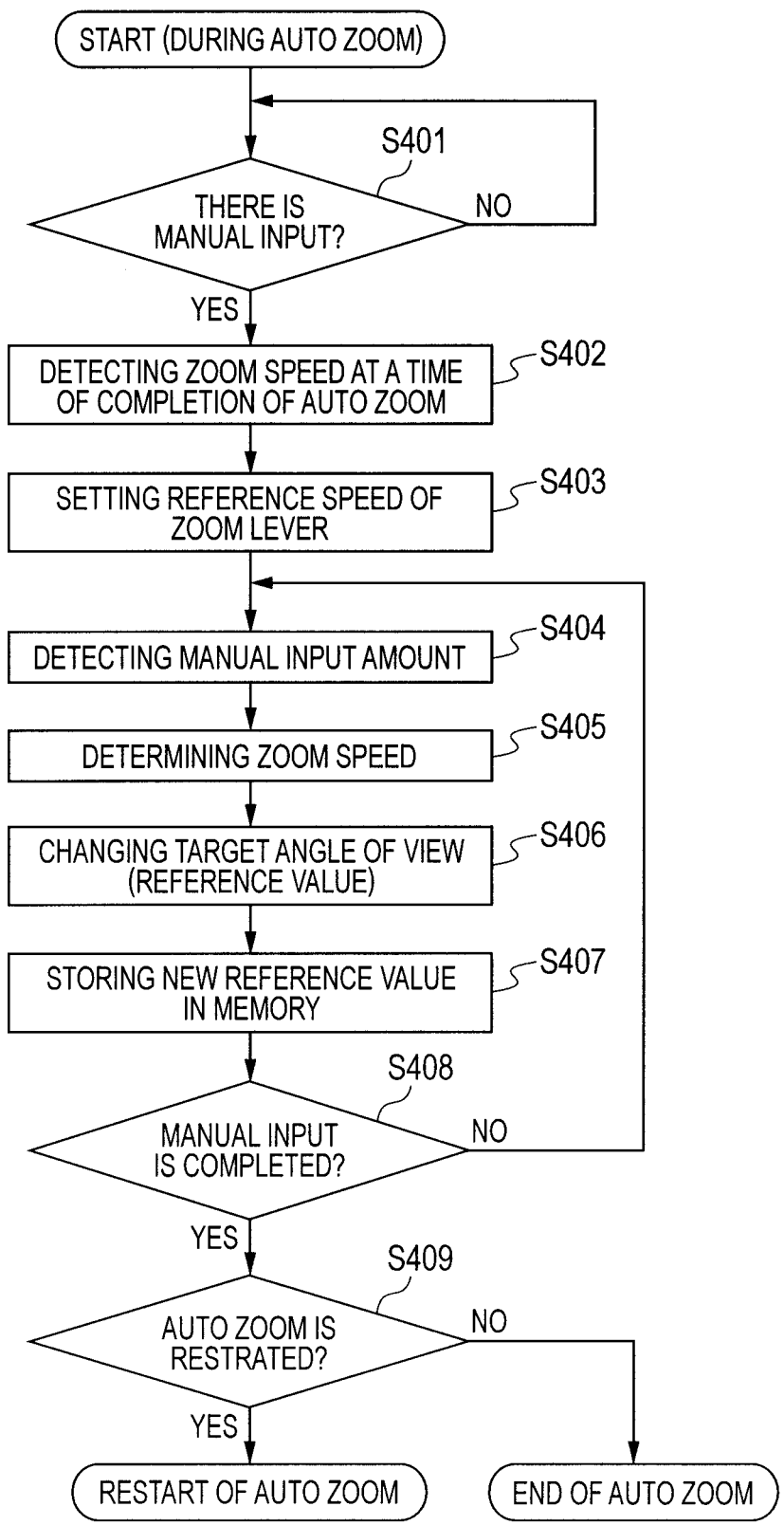
FIG. 4 is a flowchart illustrating zoom control during a manual input according to a first embodiment of the present invention.

Hereinafter, a zoom control method for the case where a target angle of view is changed using a zoom lever during an auto zoom will be described with reference to the flowchart in FIG. 4.

First, in step S401, whether or not there is a manual input during an auto zoom. If it is determined that there is no manual input, the process returns to step S401, and whether or not there is a manual input is determined again. It is determined in step S401 that there is a manual input, the process advances to step S402.

In step S402, a zoom speed according to the auto zoom immediately before the manual input, that is, at the point of time when the auto zoom was stopped is detected. In the present embodiment, in order to detect the last zoom speed during the period before the stop of the auto zoom, the zoom speed detected by the zoom speed detection unit 8 during the auto zoom is constantly updated and stored in the memory 7, and the zoom speed stored in the memory 7 at the point of time when the auto zoom was stopped is regarded as the last zoom speed during the period before the stop of the auto zoom. In other words, the image pickup apparatus according to the present embodiment detects a zoom speed based on the amount of change of a zoom magnification of a zoom lens while auto zoom control is being performed, and stores the detected zoom speed.

In step S403, the zoom speed at the time of the auto zoom being stopped, which has been detected in step S402, is set as a reference speed for the zoom lever. In the present embodiment, if the zoom speed at the time of the auto zoom being stopped is the +2 level, the reference speed of the zoom lever is then set to the +2 level.

Figure 5:
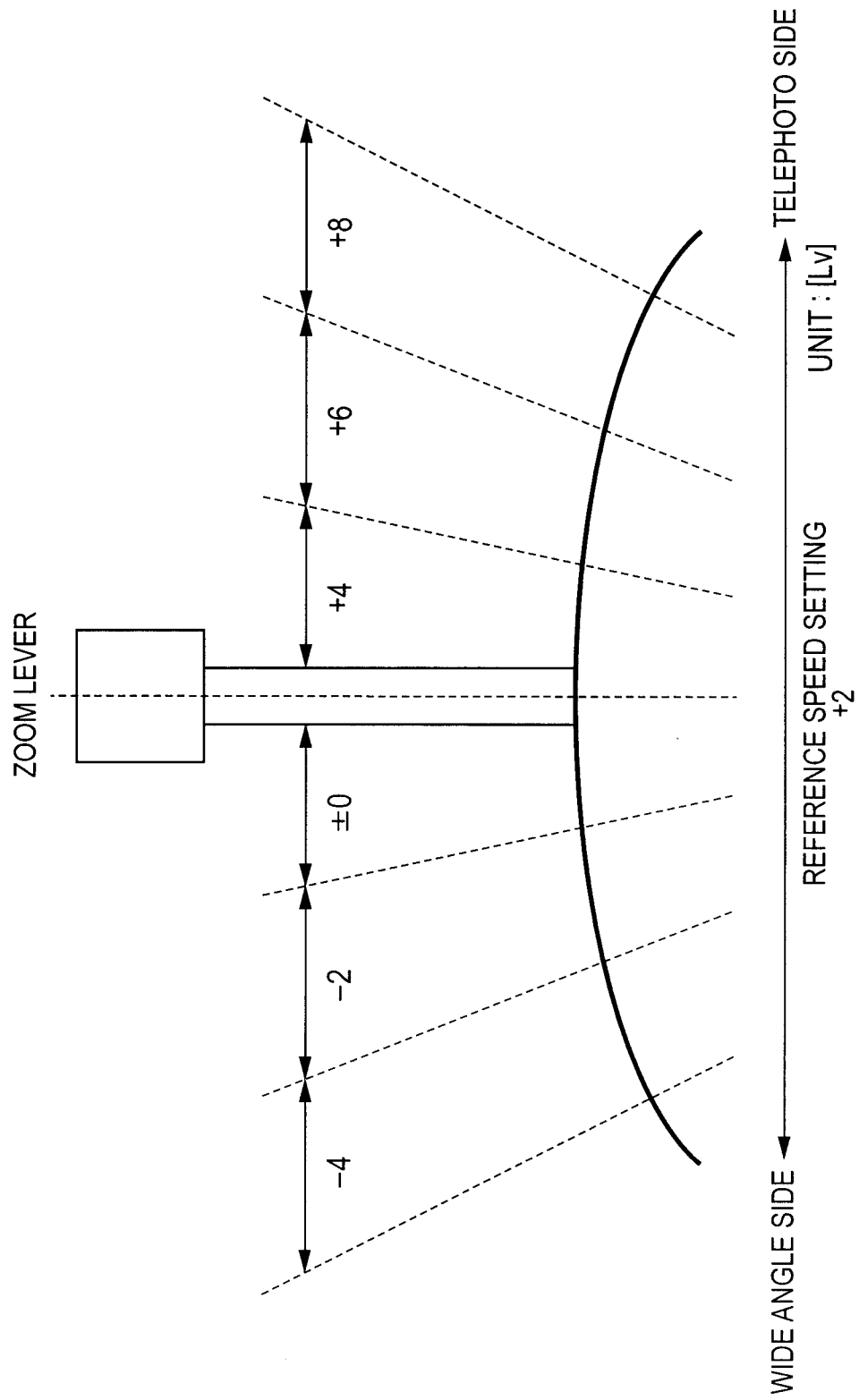
FIG. 5 is a diagram illustrating zoom speeds allocated to a zoom lever according to a first embodiment of the present invention.

Allocation of zoom speeds to the zoom lever in this case is illustrated in FIG. 5. A zoom speed of the ±0 level is allocated to wide angle A in FIG. 2, a zoom speed of the −2 level to wide angle B, a zoom speed of the −4 level to wide angle C, a zoom speed of the +4 level to telephoto A, a zoom speed of the +6 level to telephoto B, and a zoom speed of the +8 level to telephoto C. However, the zoom speed allocation in the present invention is not limited to this case. For example, where a target angle of view is changed slowly, zoom speeds may be allocated by one-level steps: a zoom speed of the +1 level is allocated to wide angle A, a zoom speed of the ±0 level to wide angle B, a zoom speed of the −1 level to wide angle C, a zoom speed of the +3 level to telephoto A, a zoom speed of the +4 level to telephoto B and a zoom speed of the +5 level to telephoto C. The zoom speed allocation is stored in advance in the zoom speed storage unit 9. When the reference speed of the zoom lever has been set as described above, the process advances to step S404.

In step S404, the manual input amount, that is, up to which region in FIG. 2 the zoom lever is inclined is detected. In the present embodiment, it is supposed that the zoom lever is inclined up to the telephoto B region.

In step S405, the zoom speed is determined with reference to the data table stored in advance in the zoom speed storage unit 9 based on the zoom speed at the time of the auto zoom being stopped, which has been detected in step S403, and the manual input amount detected in step S404. The zoom speed at the time of the auto zoom being stopped, which is used here, is a reference speed for the zoom lever. In the present embodiment, the reference speed is the +2 level and the manual input amount is of telephoto B, and thus, the zoom speed is the +6 level. As described above, the image pickup apparatus according to the present embodiment, when it has been detected that there is a manual input, the amount of the manual input is converted into a zoom magnification control amount with a zoom speed detected and stored during an auto zoom as a reference speed for the manual input. Furthermore, where the detected zoom speed is set as a reference speed, a plurality of zoom speeds to be allocated to different manual input amounts is stored in advance. Consequently, a manual input amount is converted into a zoom magnification control amount based on the plurality of zoom speeds stored in advance.

In step S406, the zoom lens 1 is driven at the zoom speed of the +6 level determined in step S405, thereby changing the target angle of view.

In step S407, the size of the object at the target angle of view resulting from the change in step S406 is detected, and stored in the memory 7 via the memory control unit 14 as a new reference value.

In step S408, whether or not the manual input has been ended is determined, and if it is determined that the manual input has not been ended, the process returns to step S404, and the manual input amount is detected again. If there is no change in the detected manual input amount, the target angle of view is changed at the same zoom speed again. If there is a change in the manual input amount, the zoom speed is changed with reference to the data table from the zoom speed storage unit 9 so as to achieve an optimum zoom speed. If it is determined in step S408 that the manual input has been ended, the process advances to step S409. The end of the manual input can be determined from, for example, the fact that there is no manual input (zoom lever operation) for a predetermined period of time.

In step S409, at the point of time when the manual input was ended, whether or not the auto zoom is restarted is determined. If it is determined that the auto zoom is restarted, the auto zoom is started again. If it is determined that the auto zoom is not restarted, the auto zoom is cancelled and the mode is changed to normal zoom. For this determination, whether or not the auto zoom start button has been cancelled or whether or not the user has cancelled the selected object via, e.g., the touch panel may be determined.

Here, in the present embodiment, the process returns to step S404 in the flow of step S408 to detect the manual input amount again; however, the process may return to step S403 to re-set a reference speed. More specifically, if the movement of the object has been changed during change of the target angle of view via a manual input, the reference speed is changed accordingly. For example, where the zoom speed at the point of time when the auto zoom was stopped is the +2 level and the manual input amount is of telephoto B, the target angle of view is changed at a zoom speed of the +6 level. If the movement of the object stopped in this situation, an update of the reference speed to the ±0 level enables change of the target angle of view at a zoom speed of the +4 level even with the same manual input amount. That is, according to the present embodiment, change of the target angle of view can be attained correspondingly to the change in the movement of the object. A movement of the object can be detected based on the difference (movement amount) between the size (prediction value) of the object that should be obtained at a target angle of view when zooming is performed at a zoom speed determined by the zoom control unit 10 and the size of the actual object obtained. However, the movement detection method according to the present invention is not limited to this example, another detection method may be employed. The update of the reference speed for the zoom speed is made so as to correct the detected difference in the size of the object, and subsequently, the zoom speed is determined according to the manual input amount. In this manner, zoom control is performed by continuing the auto zoom while changing the reference speed as needed, in accordance with the movement amount of the object detected as described above.

The above-described configuration of the image pickup apparatus according to the first embodiment of the present invention enables a target angle of view to be changed via a manual input during an auto zooming without cancelling the auto zooming. In this case, a manual change of the target angle of view is started with a reference speed which is the zoom speed of the auto zooming performed immediately before the manual input, and thus, a smooth change of an angle of view can be made to provide a captured image without giving a feeling of strangeness in appearance caused by zoom speed discontinuity occurring when switching from an auto zoom to a manual input.

Second Embodiment

Hereinafter, an image pickup apparatus according to a second embodiment of the present invention will be described.

In the present embodiment, the size of an object, which is a target of an auto zoom, that is, a reference value is directly changed via a manual input unit 12, enabling a target angle of view to be easily changed while the auto zoom being performed.

Figure 6:
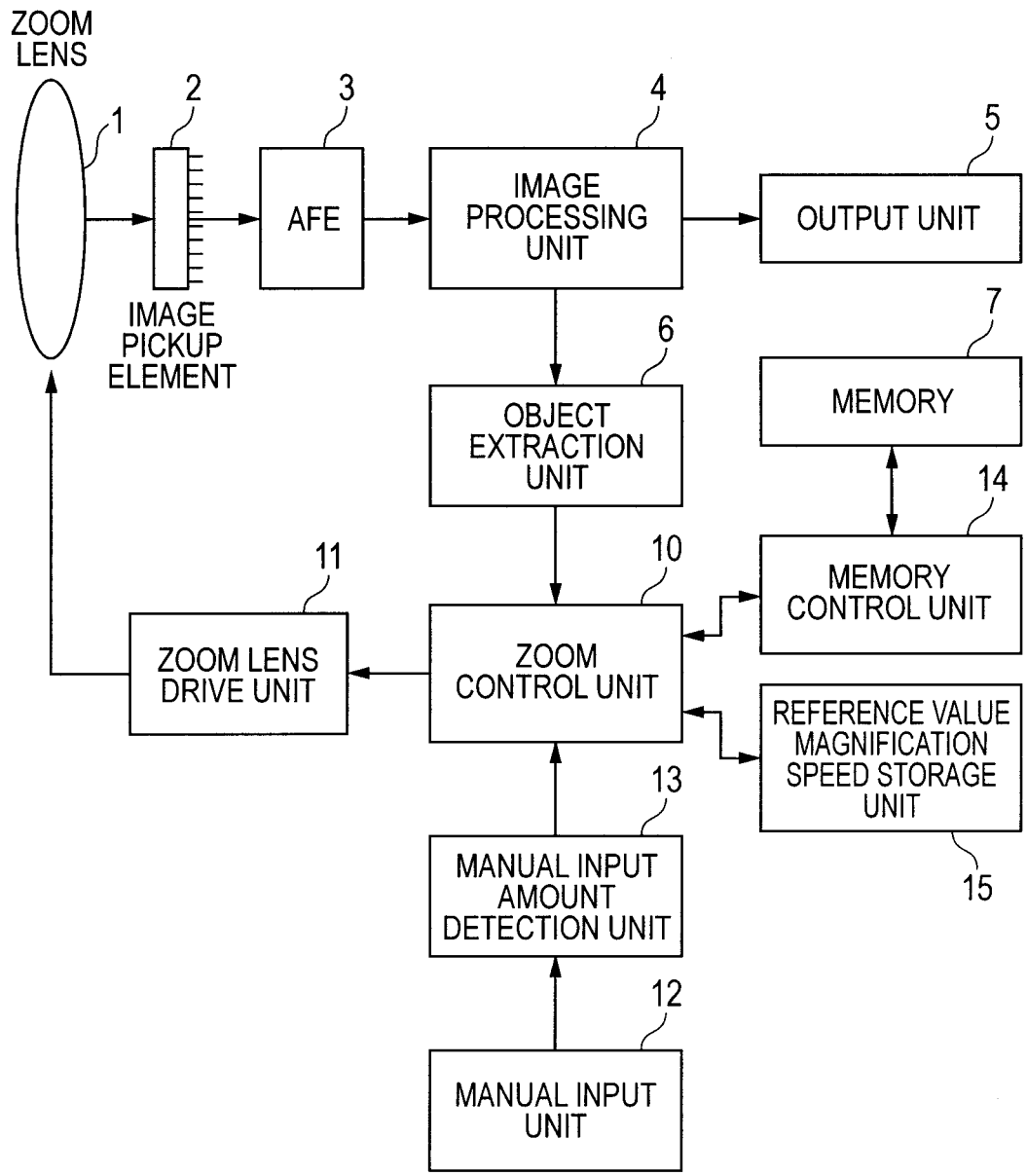
FIG. 6 is a block diagram illustrating a main configuration of an image pickup apparatus according to a second embodiment of the present invention.

FIG. 6 is a schematic diagram illustrating a main configuration of the image pickup apparatus according to the second embodiment of the present invention. The second embodiment is different from the first embodiment in not having the zoom speed detection unit 8 and the zoom speed storage unit 9. Instead, a reference value magnification speed storage unit 15 is added to store, in advance as a data table, reference value magnification speed s (which will be described later) to be allocated to a zoom lever, which is a manual input unit 12. The present embodiment does not involve inputting a zoom speed via the manual input unit 12, but involves simply changing the magnification of the reference value, and thus, a description will be given using a magnification speed.

The circuit configuration other than the above is similar to that in the first embodiment, and thus, a description thereof will be omitted.

An auto zoom control method in the present embodiment is similar to that in the first embodiment, and thus, a description thereof will be omitted.

Figure 7:
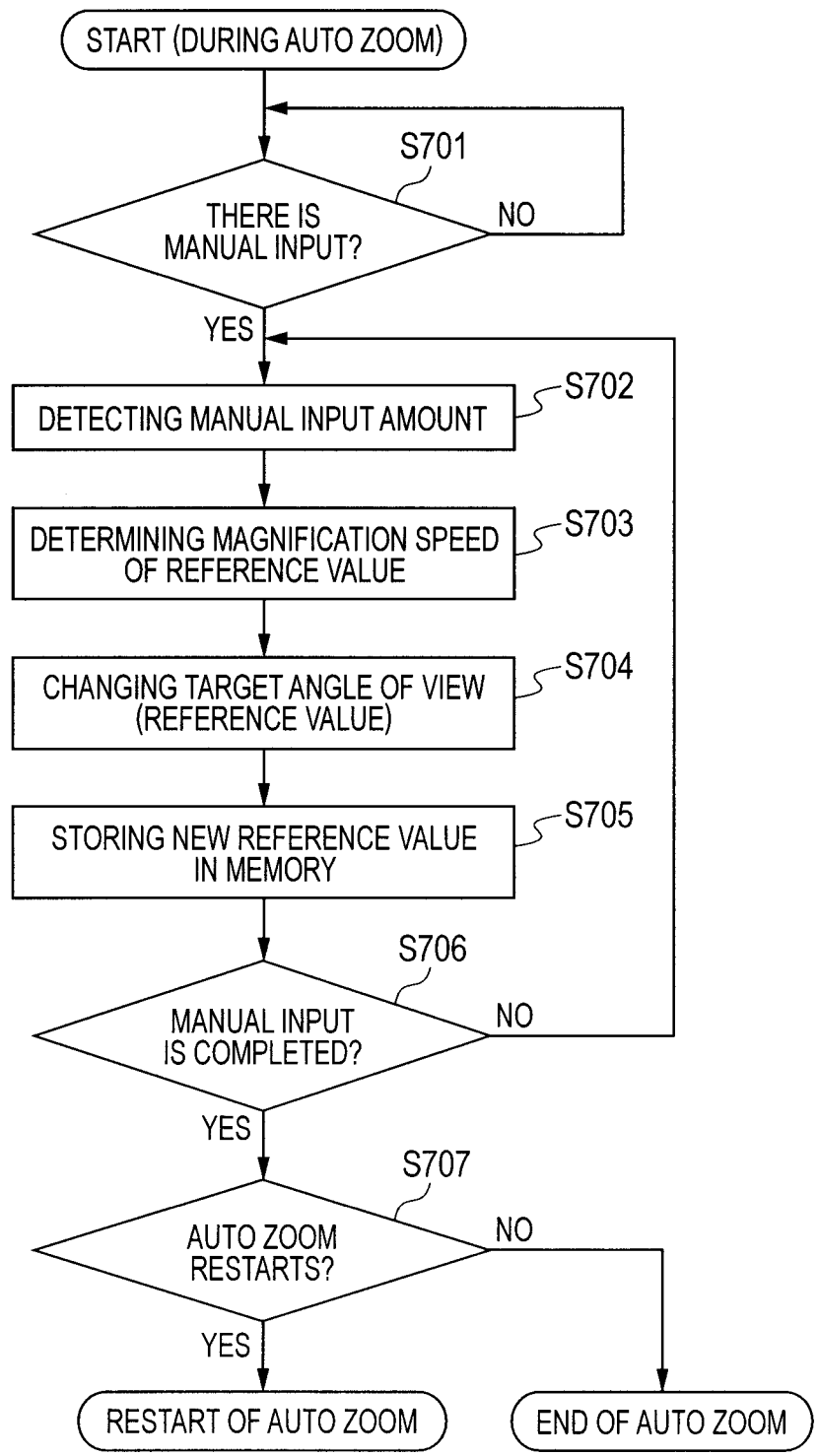
FIG. 7 is a flowchart of control to change a target angle of view via a manual input according to a second embodiment of the present invention.

A zoom control method for changing a target angle of view using a zoom lever during an auto zoom in the present embodiment will be described with reference to the flowchart in FIG. 7.

First, in step S701, whether or not there is a manual input during an auto zoom is determined. If it is determined that there is no manual input, the process returns to step S701, and whether or not there is a manual input is determined again. If it is determined in step S701 that there is a manual input, the process advances to step S702.

In step S702, the amount of the manual input, that is, up to which region in FIG. 8 the zoom lever is inclined is determined. In the present embodiment, it is supposed that the zoom lever is inclined up to the region of telephoto A.

In step S703, a magnification speed of the reference value is determined with reference to the data table stored in advance in the reference value magnification speed storage unit 15, based on the manual input amount detected in step S702.

Here, a magnification speed of a reference value in the present embodiment will be described. Magnification speeds for a reference value to be allocated to the zoom lever are illustrated in FIG. 8. A magnification speed of ½ (times/sec.) is set for wide angle A in FIG. 2, a magnification speed of ¼ for wide angle B, a magnification speed of ⅛ for wide angle C, a magnification speed of +2 for telephoto A, a magnification speed of +4 for telephoto B and a magnification speed of +8 for telephoto C. These values each indicate a scaling factor for changing a reference value (target angle of view) in one second. In the present embodiment, the zoom lever is inclined up to the region of telephoto A, and thus, the reference value magnification speed is 2 [times/step sec.]. For example, where the reference value is set to 30% relative to the entire frame, the reference value after one second is changed via a manual input to a size of 60% relative to the entire frame. Even during changing the reference value, the auto zoom can be continued by comparing the size of the object and the reference value resulting from the change.

In step S704, the reference value is changed based on the magnification speed of the reference value determined in step S703.

In step S705, a new reference value calculated in step S704 is stored in a memory 7 via a memory control unit 14.

In step S706, whether or not the manual input has been ended is determined, and if it is determined that the manual input has not been ended, the process returns to step S702, and the manual input amount is detected again. If there is no change in the detected manual input amount, the reference value is changed at the same reference value magnification speed again. If there is a change in the manual input amount, the reference value is changed at an optimum reference value magnification speed with reference to the data table from the reference value magnification speed storage unit 15. Finally, if it is determined in step S706 that the manual input has been ended, the process advances to step S707.

In step S707, at the point of time when the manual input was ended, whether or not the auto zoom is restarted is determined. If it is determined that the auto zoom is restarted, the auto zoom is started again. If it is determined that the auto zoom is not restarted, the auto zoom is cancelled and the mode is changed to the normal zoom.

As described above, in the image pickup apparatus according to the second embodiment, when it has been detected that there is a manual input, the amount of the manual input is converted into a reference value magnification speed stored in the memory on the basis of a plurality of reference value magnification speeds stored in advance. Then, the reference value stored in the memory is updated according to the magnification speed resulting from the conversion. According to the present embodiment configuration, a target angle of view can be changed via a manual input during an auto zoom without cancelling the auto zoom. Furthermore, the size of an object, which is a target of the auto zoom, that is, a reference value can directly be changed via the manual input unit 12. Accordingly, a target angle of view can easily be changed while performing an auto zoom, and the change of the angle of view can smoothly be made, providing a captured image without giving a feeling of strangeness in appearance caused by zoom speed discontinuity between before and after the start of the change of the target angle of view via a manual input.

Although a detailed description of the present invention has been given in terms of exemplary embodiment thereof, the present invention is not limited to these specific embodiments, and various modes may also be included in the scope of the present invention as far as such modes do not deviate from the spirit of the present invention. The above-described embodiments may be partially combined as appropriate.

Also, in the above-described configurations of the present invention, the control via the zoom control unit 10 may be performed by one piece of hardware, or plural pieces of hardware may share the processing to perform the control of the overall apparatus.

The present invention may also be carried out by performing the following processing. Software (computer program) providing the functions of the above-described embodiments is supplied to a system or an apparatus via a network (communication) or a computer-readable recording medium of various types. Then, a computer (or a CPU, a MPU or the like) in the system or the apparatus reads and executes the program code. The present invention can be carried out by these series of processing. In this case, the software and the recording medium with the software recorded therein as a computer program code fall within the scope of the present invention.

Furthermore, in the above configuration of the present invention, the control via a camera MPU 4 may be performed by one piece of hardware, or plural pieces of hardware may share the processing to perform the control of the overall apparatus.

The above-described embodiments are just representative examples, and many variations and alterations may be made to the present embodiments when the present invention is carried out.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-254982, filed Nov. 6, 2009, which is hereby incorporated by reference herein in its entirety.

What is claimed is:
1. An image pickup apparatus comprising:
an image pickup unit configured to convert an optical image into an image signal;
an object detection unit configured to detect an object from the image signal and output a size of the detected object;
a manual input unit configured to enable manual change of the zoom magnification with a zoom speed determined based on a reference zoom speed; and
a zoom control unit configured to perform control to automatically change a zoom magnification so that the size of the object detected by the object detection unit becomes a first size in relation to an angle of view in an automatic zoom mode, wherein the zoom control unit permits a change of the zoom magnification via the manual input unit while staying in the automatic zoom mode;

wherein the zoom control unit, after the change via the manual input unit, automatically changes the zoom magnification so that the size of the object detected by the object detection unit becomes a second size in relation to an angle of view, wherein the second size is determined with the reference to the change result via the manual input unit, and wherein when the manual input is performed while staying in the automatic zoom mode, the zoom speed is controlled such that the reference zoom speed corresponds to a zoom speed at the time of the automatically changing the zoom magnification being changed to the manually changing the zoom magnification.

2. The image pickup apparatus according to claim 1, wherein the second size is based on the change of the zoom magnification via the manual input unit.

3. The image pickup apparatus according to claim 1, further comprising a zoom speed storage unit configured to store a zoom speed, wherein a zoom speed during the automatically changing the zoom magnification is constantly updated and stored in the zoom speed storage unit, and wherein the zoom control unit performs zoom control on the basis of the zoom speed stored in the zoom speed storage unit.

4. The image pickup apparatus according to claim 3, wherein the zoom speed storage unit stores in advance a plurality of zoom speeds to be allocated to the manual input, and wherein a manual input amount is converted into a zoom magnification control amount on the basis of the plurality of zoom speeds stored in the zoom speed storage unit.

5. The image pickup apparatus according to claim 1, wherein the object extraction unit also detects the size of the object when the zoom magnification is changed via the manual input unit, and updates the second size.

6. An image pickup apparatus according to claim 1, wherein upon stop of the manual input via the manual input unit, the zoom control unit selects whether to restart or terminate the automatic control of the zoom magnification.

7. The image pickup apparatus according to claim 1, wherein the manual input unit enables change of an angle of view.

8. The image pickup apparatus according to claim 1, wherein the zoom speed via the manual input unit is determined based on the reference zoom speed and a manual input amount by user.

9. The image pickup apparatus according to claim 3, wherein a zoom speed during the automatically changing the zoom magnification is constantly updated and stored in the zoom speed storage unit.

10. The image pickup apparatus according to claim 1, wherein when the manual input is performed in a manual zoom mode, the zoom speed is controlled such that the reference zoom speed corresponds to 0.

11. The image pickup apparatus according to claim 1, wherein the reference zoom speed corresponds to a zoom speed at which a manual input amount is zero.

12. The image pickup apparatus according to claim 1, wherein the zoom speed is controlled by the zoom control unit when the manual input is performed while staying in the automatic zoom mode.

13. A method for controlling an image pickup apparatus including an image pickup unit configured to convert an optical image to an image signal, the method comprising:

detecting an object from the image signal, and outputting a size of the detected object;

automatically controlling to change a zoom magnification so that the size of the object detected in the detecting becomes a first size in relation to an angle of view in an automatic zoom mode; and manually changing the zoom magnification with a zoom speed determined based on a reference zoom speed, wherein the automatically controlling includes permitting the change of the zoom magnification in the manually changing while staying in the automatic zoom mode, and after the change in the manually changing, automatically changing the zoom magnification so that the size of the object detected in the detecting becomes a second size in relation to an angle of view, wherein the second size is determined with the reference to the change result via the manually changing, and wherein when manually changing is performed while staying in the automatic zoom mode, the zoom speed is controlled such that the reference zoom speed corresponds to a zoom speed at the time of the automatically changing the zoom magnification being changed to the manually changing the zoom magnification.

14. A non-transitory computer readable recording medium storing a program code for causing a computer to execute the control method according to claim 13.

* * * * *